United States Patent [19]
Patel et al.

[11] Patent Number: 4,579,927
[45] Date of Patent: Apr. 1, 1986

[54] COPOLYMERS OF FLAVANOID TANNINS AND ACRYLIC MONOMERS

[75] Inventors: Arvind D. Patel; Thomas E. Sample, Jr., both of Houston, Tex.

[73] Assignee: Dresser Industries, Inc., Dallas, Tex.

[21] Appl. No.: 536,463

[22] Filed: Sep. 26, 1983

[51] Int. Cl.[4] ............................................. C08H 5/02
[52] U.S. Cl. .................................................. 527/400
[58] Field of Search ..................... 527/400; 526/238.2, 526/238.3

[56] References Cited

U.S. PATENT DOCUMENTS

| | | |
|---|---|---|
| 2,209,289 | 7/1940 | Wallace . |
| 2,354,672 | 8/1944 | Eastes et al. . |
| 2,477,157 | 7/1949 | Wayne . |
| 2,582,265 | 1/1952 | Monroe . |
| 2,582,266 | 1/1952 | Monroe . |
| 2,704,277 | 3/1955 | Giammaria . |
| 2,782,241 | 2/1957 | Gray et al. . |
| 2,831,022 | 4/1958 | Blaricom et al. . |
| 2,938,893 | 5/1960 | Gray et al. . |
| 3,108,956 | 10/1963 | Dever et al. . |
| 3,230,201 | 1/1966 | Hart et al. . |
| 3,476,795 | 11/1969 | Allan . |
| 3,511,820 | 5/1970 | Verdol et al. . |
| 3,511,874 | 5/1970 | Allan . |
| 3,535,238 | 10/1970 | Kolaian . |
| 3,535,239 | 10/1970 | Kolaian . |
| 3,537,992 | 11/1970 | Kolaian . |
| 3,546,199 | 12/1970 | Christian et al. . |
| 3,642,622 | 2/1972 | Kablaoui et al. . |
| 3,730,900 | 5/1973 | Perricone et al. . |
| 3,752,763 | 8/1973 | Kablaoui et al. . |
| 3,768,565 | 10/1973 | Persinski et al. . |
| 3,856,845 | 12/1974 | Sears . |
| 3,879,298 | 4/1975 | Walker . |
| 3,879,299 | 4/1975 | Walker . |
| 3,907,927 | 9/1975 | Guilbault . |
| 3,932,488 | 1/1976 | Sears . |
| 3,953,342 | 4/1976 | Martin et al. . |
| 4,357,245 | 11/1982 | Engelhardt et al. . |
| 4,388,451 | 6/1983 | Culbertson et al. . |
| 4,457,790 | 7/1984 | Lindert et al. ..................... 524/398 |

FOREIGN PATENT DOCUMENTS

| | | |
|---|---|---|
| 2502012 | 7/1975 | Fed. Rep. of Germany . |
| 2444108 | 1/1976 | Fed. Rep. of Germany . |
| 2547773 | 4/1976 | Fed. Rep. of Germany . |

OTHER PUBLICATIONS

Gray, George R. et al., "Composition and Properties of Oil Well Drilling Fluids", 4th Ed. Gulf Publishing Co., Aug. 1981.

Culbertson, B. M. et al. "Copolymerization of Allyl and Methallyl Substituted Phenols with Maleic Anhydride and Maleimides", Polymer Preprints ACS Div. Polym. Chem., 23(1), 1 (1982).

Chen, R. et al., "Graft Copolymerization of Lignosulfonate and Styrene", Journal of Applied Polymer Science, 25, 2211–2220 (1980).

Chen, R. et al., "Study of the Graft Copolymerization of Lignosulfonate and Acrylic Monomers", Journal of Applied Polymer Science, 25, (1980).

Kutner, A. et al., "Sodium Ethylenesulfonate-N-Vinylpyrrolidine Copolymers", Journal of Polymer Science, 38 (1959).

Chesser, B. G. et al., "High Temperature Stabilization of Drilling Fluids with a Low-Molecular-Weight Copolymer", Journal of Petroleum Technology (Jun. 1980).

Russian Publication, "Organic Viscosity Reducers in Clay Solutions", Zhur. Priklad Khem., 35, (1962) (in Russian).

Primary Examiner—Joseph L. Schofer
Assistant Examiner—N. Sarofim
Attorney, Agent, or Firm—Arnold, White & Durkee

[57] ABSTRACT

This invention relates to a polymer and methods for its preparation. The water soluble polymer is especially useful in that it exhibits superior thermal stability characteristics when used as an additive in aqueous drilling fluids. The polymer consists of a minor portion of tannin derived monomers and one or more acrylic monomers. Other monomers are added to enhance the functional characteristic of the polymer. The methods of this invention include either the mixing of monomer followed by polymerization of that mixture, or the preparation of a solution of the tannin monomers and polymerization medium followed by addition and polymerization of the comonomers at a controlled rate. Hydrolysis is an optional step in either method.

16 Claims, No Drawings

COPOLYMERS OF FLAVANOID TANNINS AND ACRYLIC MONOMERS

FIELD OF THE INVENTION

This invention relates to a novel mixture of water soluble monomers for use after polymerization as additives in the formulation of aqueous drilling fluids. A general problem has been recognized in that commercially available additives to drilling fluids have demonstrated unsatisfactory thermal stability. The effect of thermal instability is a severe decrease in the functional characteristics of the drilling fluid system.

In formulating a polymer for use as a drilling fluid additive, it is necessary to consider the desired functional characteristics of the drilling fluid. Specifically, the viscosity, gel strength, filtrate loss and contamination control characteristics of the drilling fluid must be maintained within acceptable ranges.

Various water soluble polymers have been synthesized or otherwise developed, and certain polymers are known to occur naturally, some of which have shown at least a limited ability to control the viscosity, gel strength and filtrate loss of aqueous drilling fluids. However, the thermal stability of these materials is unacceptable, making their use in drilling activities of limited value. During the drilling of certain deep wells, i.e., in excess of fifteen thousand feet, or in geographic areas of high geothermal activity, the viscosity, gel strength and fluid loss of the drilling fluid are adversely affected as a function of temperature such that the noted functional characteristics are not within acceptable ranges.

The drilling fluid itself is an essential item in the oil-well drilling system. In particular, in rotary well drilling, the principal functions performed by the drilling fluid are to carry cuttings from beneath the drill bit, transport the cuttings from the annulus and permit their separation at the surface. The drilling fluid, or drilling mud as it is more typically called, also cools and cleans the drill bit, reduces friction between the drill string and sides of the drill hole and maintains the stability of uncased sections of the borehole.

It is essential that the drilling fluid formulation be such that it will prevent the inflow of fluids, such as oil, gas or water, from the permeable rock formations which have been penetrated or which are being penetrated.

The drilling fluid should also contain additives which permit the formation of a thin, low permeability filter cake which seals pores and other openings in the formations which are penetrated by the bit. Finally, the drilling mud must assist in the collection and interpretation of information available from drill cuttings, cores, and electrical logs.

There are certain limitations which are placed on the formulation of drilling muds for actual commercial use. The drilling fluids must be formulated such that they are not injurious to the drilling personnel and not damaging or offensive to the environment. The drilling fluids must not cause unusual or expensive methods of completion of the drilled hole nor interfere with normal productivity of the fluid bearing formation. Finally, it is essential that the drilling fluid not corrode or cause excessive wear to drilling equipment. From these requirements has arisen the need for specialized drilling additives which will assist the drilling mud formulation in the performance of these various functions.

The effectiveness of a drilling fluid and in particular the additives found in the drilling fluid are evaluated by measurement of certain characteristics of the drilling system. The viscosity, gel strength, filtrate loss, contamination control and tolerance to divalent ion characteristics of drilling fluids and drilling systems are all directly attributable to the drilling fluid or drilling mud. These properties, their definitions and a general explanation is found in a comprehensive treatise entitled *Composition and Properties of Oil Well Drilling Fluids*, 4th Ed., George R. Gray and H. C. H. Darley, Gulf Publishing Company, (1980).

The first essential characteristic of the drilling fluid which is controlled by the additive of this invention is its viscosity. The viscosity of drilling fluids is very difficult to control because of the adverse conditions under which drilling fluids are used as well as the excessively elevated temperatures to which they will be exposed. In this regard, during the drilling of certain deep wells, i.e., greater than 15,000 feet, it is common to be exposed to temperatures at which thermal decomposition of certain drilling fluid additives occurs. These temperatures can easily cause a severe change in the viscosity of the drilling fluid and thus adversely affect the flow characteristics of the drilling mud and adversely affect the overall drilling operation. Such viscosity modification at these temperatures is not acceptable in normal drilling fluids. Additionally, certain areas of the country have excessive geothermal activity resulting in extremely high temperatures. The same effect can be had on drilling fluids at these geothermally elevated temperatures as in deep wells. In any event it is necessary that the apparent viscosity of the drilling fluid be controlled within desired ranges, which are in many instances dependent on the geographic area of activity. The apparent viscosity is a function of plastic viscosity and yield point. As a general rule, as the mud weight increases, the plastic viscosity increases, but the yield point is allowed to increase by a much smaller magnitude.

A second essential characteristic is the gel strength of the drilling fluid. Gel strength is a characteristic of the drilling fluid which reflects the ability of the drilling fluid to maintain a suspension of additives and drill cuttings, especially when circulation is stopped. As can be appreciated, if circulation of the drilling fluid is terminated, and if all of the suspended cuttings and additives to the drilling fluid were then permitted to settle to the lowest point, an intolerable situation would be encountered, and in all likelihood the drill string would be broken and the bit lost.

If the drilling fluid gel strength is too low, it is typically increased by adding bentonite. Ideally, the drilling fluid gel strength should be just high enough to suspend barite and drill cuttings when circulation is stopped. Higher drilling fluid gel strengths are undesirable because they retard the separation of cuttings and of entrained gas at the surface, and also because they raise the pressure required to reestablish circulation after changing bits. Furthermore, when pulling pipe, a high gel strength may reduce the pressure of the mud column beneath the bit because of a swabbing action. If the reduction in pressure exceeds the differential pressure between the mud and the formation fluids, the fluids will enter the hole, and possibly cause a blowout. Similarly, when running pipe into the hole, the downward motion of the pipe causes a pressure surge which may, when conditions are critical, cause induced fracturing with consequent loss of circulation. Methods have been developed for calculation of the magnitude of these pressure surges.

Related to the gel strength control is the ability of the drilling fluid to tolerate divalent ions. Typically, thinners are used to reduce the gel strength of fresh water or low salinity muds. The use of some types of such thinners has an unfortunate secondary effect, i.e., the replacement of calcium or other polyvalent cations on clay cuttings by the sodium used to solubilize these particular thinners. This tends to disperse the clay into small particles, some of which are not removed at the surface, and are again recycled until they are reduced to colloidal size. This action makes the control of viscosity very difficult and expensive when drilling through colloidal clay formations with a fresh water mud (drilling fluid). The dispersive effect of the sodium ion may be offset by the addition of a calcium compound or else by the use of a polymer brine mud. The drilling fluid additive of this invention displays a high tolerance to divalent ions.

Another essential function of the drilling fluid is its ability to seal permeable formations exposed by the bit with a thin low permeability filter cake. In order for a filter cake to form it is essential that the drilling fluid contain particles of a size only slightly smaller than that of the pore openings of the formation. These particles are trapped in the surface pores while finer particles are carried deeper into the formation. The particles which are deposited on the formation are known as the filter cake.

It is essential to control the permeability of the filter cake. This permeability depends on the particle size distribution of solids suspended in the drilling fluid and on electrochemical conditions. In general, the more particles there are in the colloidal size range, the lower the cake permeability. The presence of soluble salts in clay bearing muds increases the permeability of the filter cake sharply. Filtration performance in the well is routinely judged by means of the standard American Petroleum Institute filtration test. In this test, the mud is subjected to static filtration through filter paper for thirty minutes, and the volume of filtrate and the cake thickness are then measured. Within any specific drilling fluid and drilling system it is necessary to carefully control the filtrate loss within predesigned tolerance ranges. These tolerance ranges will vary from geographic area to geographic area depending on the type of formations encountered.

During drilling operations, it is always anticipated that the drilling fluid will be contaminated with various materials. Some of the potential contaminants are damaging to the ionic balance and viscosity properties of the drilling fluid. These impurities include sodium chloride, gypsum as well as other minerals and the like.

The Prior Art

The use of tannin derivatives, such as quebracho extract, as an aqueous drilling fluid thinner is well known and is described by the prior art. The use of quebracho and tannin derivatives, such as sulfoalkylated tannins, is described in *Composition and Properties of Oil Well Drilling Fluids*, 4th Ed., George R. Gray and H. C. H. Darley, Gulf Publishing Company, (1980). The similar use of lignins, lignosulfonates, and chrome lignosulfonates is also described in this reference.

The method of synthesis and application of tannin derived low viscosity water soluble copolymers used in drilling fluids is disclosed in U.S. Pat. No. 2,477,157. In this invention, tannins and hydroxyl containing substances are copolymerized in a condensation reaction by applying heat in an anhydrous medium. U.S. Pat. Nos. 3,856,845 and 3,932,488 disclose an etherified tannin copolymer that is obtained by reacting the hydroxyl group in the tannin with an olefinic functional group in the comonomer in the presence of an alkaline catalyst. A sulfonated tannin is disclosed in U.S. Pat. No. 2,831,022.

Lignins and either a polyhydric alcohol or a polycarboxylic acid are reacted in acidic conditions with heat to yield a copolymer characterized by a plurality of ethers and esters in U.S. Pat. No. 2,209,289.

Much work has been done with catechol tannins. For example, an insoluble copolymer useful as an ion exchange resin obtained by the condensation reaction of catechol tannins with polyamines and formaldehyde is disclosed in U.S. Pat. No. 2,354,672. A polymer useful in coating compositions, obtained by etherifying catechol tannins with a monohalogen fatty acid or an aralkyl halide followed by the condensation reaction with formaldehyde, is disclosed in U.S. Pat. Nos. 2,582,265 and '266.

Other tannin reactions include polyurethanes from tannin esters as described in U.S. Pat. No. 3,476,795, tannin esters as described in U.S. Pat. No. 3,511,874, and polyoxyalkylene ether polyols as described in U.S. Pat. No. 3,546,199.

Tannin extracts from barks are disclosed in U.S. Pat. Nos. 2,782,241 and 2,938,893.

The free radical copolymerization of allyl and methylallyl substituted phenols with maleic anhydride and maleimide is described in *Polymer Preprints*, ACS Div. Polym. Chem., 23(1), 1 (1982). The free radical initiated graft copolymerization of lignosulfonate with styrene is reported in the *Journal of Applied Polymer Science*, 24, 1609–1618 (1979), and with acrylic monomers in the *Journal of Applied Polymer Science*, 25, 2211–2220 1980.

The method of synthesis and application of other low viscosity water soluble copolymers used in drilling fluids is described by the prior art. Polymers derived from the copolymerization of maleic anhydride and N-vinyl ring compounds such as N-vinyl morpholine, N-vinyl pyrrolidone, and N-vinyl cyclic carbamate are disclosed in U.S. Pat. No. 3,108,956.

The synthesis of water soluble polymers containing sulfonic acid moities has been described in detail in many publications. For example, synthesis of the copolymers of vinyl sulfonic acid with acrylamide and vinyl pyrrolidone was published in *J. Poly. Sci.* 38, 274 (1959). Extensive work has been done on copolymers containing 2-acrylamido-2-methylpropane sulfonic acid as a co-monomer. This work is described in U.S. Pat. Nos. 3,933,342, 3,768,565 and 3,907,927 and in Deutsche Offenlegungschrift's Nos. 2,502,013 and 2,547,773. Copolymers from vinyl and/or alkyl sulfonates with acrylamide and vinyl amides are described in Deutsche Auslegungschrift's No. 2,444,108.

The use of substituted 1, 2-dihydroxybenzenes and 1, 2-dihydroxy aromatic heterocyclic compounds as disperants in aqueous drilling fluids is described in U.S. Pat. Nos. 3,535,238, 3,535,239, and 3,537,912. It is disclosed in *Zhur. Priklad Khem.* 35, pp. 638–647 (1962) "Organic Viscosity Reducers in Clay Solutions" that the orthodihydroxy benzenesulfonic acids and their alkali metal salts will reduce the viscosity of aqueous drilling fluids. The corresponding meta and para dihydroxy benzene derivatives are ineffective.

The method of synthesis and application to use in aqueous drilling fluids for colloid stabilization of a low molecular weight copolymer is disclosed in U.S. Pat. No. 3,730,900. The product is a copolymer of styrene sulfonic acid and maleic anhydride.

The copolymers having tannin type structures and prepared according to this invention are unusually effective additives for aqueous drilling fluids. These copolymers provide colloidal stability, lower viscosity and gel strength, lower filtrate loss, and thinner filter cakes. The performance and effectiveness of these copolymers in aqueous drilling fluids which are subjected to elevated temperatures for extended periods of time are greatly superior to the next level of comparable aqueous drilling fluid additives as described in U.S. Pat. No. 3,730,900 and in the *Journal of Petroleum Technology*, 950 (1980). The cost of copolymers made according to this invention is much lower.

It has previously been known to use lignosulfonates, and the copolymer of maleic anhydride and styrene sulfonic acid as dispersants. As previously indicated these do not perform well at high temperatures.

A related patent application is "Thermally stable Drilling Fluid Additive," by Arvind D. Patel, filed June 7, 1983, now U.S. Pat. No. 4,525,562. This application discloses a thermally stable drilling fluid additive comprising a catechol based monomer and a dicarboxylic acid. Other monomers and materials are added to enhance the functional characteristics of the drilling fluid additive. It is incorporated herein by reference.

Other patents which are relevant to the concept of this invention include: U.S. Pat. No. 2,704,277 (preparation of copolymers of maleic anhydride, allyl phenyl ether or allyl benzyl ether); U.S. Pat. No. 3,230,201 (formation of polymers and copolymers bearing sulfonic acid groups by reacting the appropriate polymer with compounds containing sulfonyl fluoride groups and hydrolyzing the product); and U.S. Pat. No. 3,511,820 (formation of solid polymers of 2-phenylallyl alcohol, and its esters with maleic anhydride).

Additional U.S. patents which are relevant to the drilling fluid additive of this invention are: U.S. Pat. No. 3,642,622 (4-allyldihydroxybenzene as a drilling fluid dispersant); U.S. Pat. No. 3,752,763 (4-vinyldihydroxybenzene as a drilling fluid dispersant); U.S. Pat. No. 3,879,298 (rheology controlling mixture including an ethylenedicarboxylic acid); and U.S. Pat. No. 3,879,299 (rheology controlling mixture including a water soluble chromate and an ethylenedicarboxylic acid).

Examples of drilling fluid additives which are available commercially are sold under the trade names MIL-TEMP and SPERSENE. These materials are offered respectively by Milchem Co. and Dresser Industries, Inc. MIL-TEMP is a sulfonated copolymer of polystyrene and maleic anhydride and is manufactured by ARCO. SPERSENE is a chromium lignosulfonate. Both of these drilling fluid additives are susceptible to thermal stability problems.

Therefore, it is an object of this invention to provide a water soluble polymer which will effectively control the viscosity, gel strength and fluid loss characteristics of an aqueous drilling fluid when exposed to downhole temperatures in excess of 300° F.

It is a further object of this invention to provide an additive which will effectively control the viscosity, gel strength, and fluid loss of an aqueous drilling fluid which becomes contaminated by sodium chloride as is frequently encountered during well drilling.

It is a still further object of this invention to provide a drilling fluid additive which will effectively control the viscosity, gel strength and fluid loss of aqueous drilling fluids which have had their densities increased by the addition of certain weighting materials such as barium sulfate.

These and other objects of this invention will become apparent from the detailed description of the preferred embodiments.

SUMMARY OF THE INVENTION

This invention relates to the copolymers of flavanoid tannins and ethylenically unsaturated comonomers, the major improvement comprising a free radical initiated polymerization which leaves intact the hydroxyls and other reactive sites of the tannin monomers. These reactive sites in the tannin monomers can be utilized in numerous chemical transformations either before or after polymerization. By suitable choice of comonomers the resulting copolymer products can be made to be water soluble, water insoluble, organic soluble or organic insoluble. The uses contemplated for this invention are wide.

This invention further relates to a water soluble polymer, and the methods for its preparation, which exhibits superior thermal stability characteristics when used as an additive in aqueous drilling fluids. The polymer consists of a tannin derived monomer and an acrylic acid derived monomer. Other monomers and materials are added to enhance the functional characteristics of the drilling fluid.

A method of this invention includes the mixing of monomers, polymerization of that mixture, and optionally, the step of hydrolysis.

DETAILED DESCRIPTION OF THE PREFERRED EMBODIMENTS

By suitable choice of tannins and comonomers, a wide variety of resulting copolymer products can be obtained. Among the possible uses and applications contemplated are: surface active materials; polyvalent metal sequestrants; scale inhibitors; antioxidant compositions; hydraulic cement and concrete water control, set time, and air-entraining admixtures; clay and mineral pigment dispersants; latex suspension stabilizers; adhesives; herbicide and pesticide carrier formulations; thermoplastic and thermosetting resins; elastomers; binders for cellulose, wood and synthetic fiber composites; slip additives in ceramic arts; foundry casting mold binders; water clarifying polymers; surfactant additives for secondary and tertiary oil recovery water floods; photosensitive materials; protein denaturants; leather tanning and conditioning agents; light-screening polymers; metal substantive cements and coatings; pigments, toners and developers for photoelectric reproduction and copying systems; ion exchange and active catalyst-binding polymers; dyeing and coloring agents; trace-nutrient carriers for agriculture; heavy metal scavenging polymers for soluble nuclear waste; enhancement in moisture permeability, antistatic properties, dyeability, and "hand" of synthetic fibers and fabrics; corrosion inhibiting copolymers; metal cleaning compositions; flotation and separation agents in ore and mineral beneficiation; as well as numerous additional useful applications which will be apparent to those skilled in various specialized areas within the polymer arts.

The polymers prepared according to this invention are especially effective as additives for aqueous drilling fluids used during rotary drilling operations. The addition of the polymers prepared according to this invention to aqueous drilling fluids deflocculates the colloidal clay and drilled solids usually present in the fluid. This deflocculation permits relatively higher drilling fluid densities at lower viscosities and gel strengths. Another beneficial result is a reduction of the amount of drilling fluid filtrate loss to the formation with a corresponding reduction of the thickness of the filter cake deposited on the wall of the hole. When used as aqueous drilling fluid additives, polymers prepared according to this invention exhibit outstanding tolerance of divalent ions, specifically the calcium ion in the form of gypsum. These copolymers are stable at high temperatures and in the presence of dissolved ions. Furthermore, the copolymers prepared according to the invention are highly effective additives for drilling fluids used for high alkalinity aqueous drilling operations and for drilling fluids containing soluble divalent ions.

In synthesizing the polymers which have utility in the product and process of this invention, flavanoid tannin monomers are essential. Flavanoid tannins are recognized as falling into either of two broad structural series: the resorcinol-catechol series and the resorcinol-pyrogallol series. Inasmuch as they often occur together in nature, members from either one or both of the flavanoid series, or oligomeric combinations thereof, are contemplated as broadly suitable for the practice of this invention. These flavanoid tannins have the structure identified as Formula I.

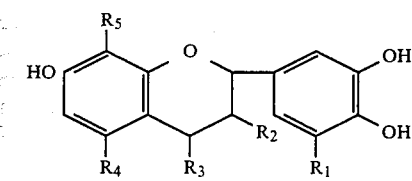

FORMULA I

In this flavanoid tannin monomer $R_1$ and $R_2$ are equal or different and represent hydrogen or hydroxyl. $R_3$ and $R_4$ are equal or different and represent hydrogen, hydroxy or methyl. $R_5$ is hydrogen or methyl. When $R_1$ is a hydrogen, Formula I represents a flavanoid tannin of the resorcinol-catechol series, and when hydroxyl, the resorcinol-pyrogallol series. The precise percentage of the Formula I flavanoid tannin material that is present in the copolymer will vary depending on the intended end use of the copolymer, and as additional monomers are added to the formulation, percentages of each individual monomer will vary depending on the end use to which the product will be placed. Common sources of flavanoid tannins include extracts of quebracho, wattle, mimosa, mangrove, chestnut, gambier and cutch.

In certain applications, and specifically in the examples which follow, the flavanoid tannins are sulfonated to enhance solubility characteristics. In these instances the Formula I material would have a sulfonate group, i.e. $Na^+SO_3^-$, extending from the formula. It should be understood for purposes of this application that Formula I refers to either form.

A second essential element present in the polymer formulation of this invention is an ethylenically unsaturated monomer having the general structure as illustrated in Formula II.

FORMULA II

Examples of suitable comomoners containing this ethylenically unsaturated structure include the acrylic monomers which, for the purposes of this invention, include acrylic acid, methacrylic acid, crotonic acid, fumaric acid, maleic acid, itaconic acid, tetrahydrophthalic acid, and citraconic acid. Since these compounds can be chemically transformed without affecting the ethylenically unsaturated structure, the esters, amides, nitriles, anhydrides and imides are also suitable. For the purposes of this invention, esters shall include half esters, amides shall include half amides, and imides shall include N-substituted imides. Further examples of suitable comonomers include styrene, linoleic acid, allyl alcohol, allyl chloride, diallylamine, propylene, butylene, N-vinyl formamide, N-vinyl acetamide, N-vinyl methyl formamide, N-vinyl-N-methyl acetamide, vinyl ethers, vinyl esters, N-vinyl pyrolidone and vinyl imidazole, styrene sulfonic acids, vinyl sulfonic acids, vinyl phosphonates, and 2-acrylamido-2-methylpropane sulfonic acid. As with the acrylic monomers, derivatives of these further examples wherein the ethylenically unsaturated structure is retained are also suitable.

A monomer which is optionally present in the polymer formulation of this invention is an unsaturated sulfonic acid having the general formula as illustrated by Formula III.

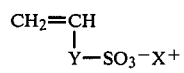

FORMULA III

In Formula III, Y represents a direct combination or bridging element as, for example, in the formula:

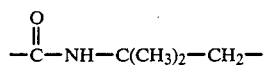

and $X^+$ represents a cation. In the most preferred embodiment of this invention the unsaturated sulfonic acid of Formula III is present as a minor component by weight of the drilling fluid additive formulation. In less preferred embodiments of this invention the unsaturated sulfonic acid of Formula III is present in an amount up to 80% by weight of the drilling fluid additive formulation.

It is frequently preferable that certain thinners be added to drilling fluids. Thinners are added to the drilling fluid to reduce flow resistance and gel development. Thinners are also added to counteract the effect of salts, to emulsify oil and water, and to stabilize drilling fluid properties at elevated temperatures. The product of this invention is useful as a thinner for drilling fluids. This usefulness as a thinner is improved by incorporating dicarboxylic acids into the product and process of this invention. Most particularly, maleic anhydride, tetrahydrophthalic anhydride, itaconic acid or combinations thereof have shown exceptional utility in the product and process of this invention. The dicarboxylic acids should be present at a level of at least 5% by weight of the additive solution. However, in other embodiments the dicarboxylic acid is present in an amount of up to about 50% by weight, and most preferably is present at a level of approximately 30% by weight of the additive solution.

Thus, in the most preferred embodiment of this invention, flavanoid tannin monomers of Formula I, acrylic acid monomers, and a dicarboxylic acid are combined to form the ingredients for polymerization. While this formulation functions effectively as a drilling fluid additive, other materials, which are discussed hereinbelow, are added to substantially enhance the functional characteristics of the drilling fluid additive of this invention. In another preferred embodiment of this invention, flavanoid tannin monomers of Formula I, acrylic acid monomers, unsaturated sulfonic acid of Formula III, and a dicarboxylic acid are combined to form the ingredients for polymerization.

Another material which can be added to enhance the functional characteristics of the drilling fluid additive, especially after hydrolysis, is a substituted amide of the general configuration found in Formula IV.

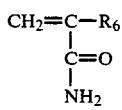

FORMULA IV

In Formula IV $R_6$ is a hydrogen or a methyl group. Functionally, the substituted amide of Formula IV decreases substantially the fluid loss and acts as a thinner after hydrolysis. The substituted amide of Formula IV is typically present in amounts of up to 80% by weight of the drilling fluid additive formulation. In most preferred embodiments substantially less than 80% by weight will be present.

Hydrolysis of the polymers of this invention especially by addition of sodium hydroxide to a pH of from about 8 to about 12 converts the amide function found in Formula IV to a carboxyl function as illustrated by Formula V.

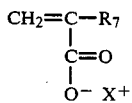

FORMULA V

In the monocarboxylic acid obtained by hydrolysis of the substituted amide, as illustrated by Formula V, $R_7$ represents hydrogen or methyl while $X^+$ represents a cation.

A variety of polymerization systems may be employed in practicing the present invention, such as solution polymerization, precipitation polymerization and emulsion polymerization. Solution polymerization is carried out either in water or in an organic solvent. The resulting copolymer is isolated by distilling off the solvent or by precipitation. Precipitation is accomplished by adding a miscible organic solvent in which the copolymer is insoluble. Examples of suitable solvents are acetone, methanol and other hydrocarbons. Solution polymerization is the preferred method of this invention.

The use of precipitation polymerization results in the preparation of a solution of the monomers of this invention in an organic solvent in which the monomers are soluble but the polymer is insoluble. In this precipitation polymerization process, the copolymer separates as a solid as polymerization occurs. The polymer can be isolated either by filtration or by distilling off the solvent. Final drying is accomplished by conventional means.

The third method for polymerization is emulsion polymerization. Preparation of the polymers of this invention in an emulsion involves emulsifying the aqueous solution of monomers in a water immiscible organic solvent such as cyclohexane, toluene or the like. Emulsification is accomplished by addition of 0.5% to 8%, preferably 1% to 4%, of a suitable water in oil type of emulsifier. An emulsion is a substantially permanent heterogeneous liquid mixture of two or more liquids which do not normally dissolve in each other but which are held in suspension, one in the other, by small amounts of additional substances known as "emulsifiers." These emulsifiers modify the surface tension of the droplets to keep them from coalescing. Surface active agents are good emulsifiers. Typical among these are quarternary ammonium compounds, sulfonated oils, and polyhydric alcohol esters and ethers.

In all of the polymerization systems, polymerization is accomplished by addition of a suitable free-radical initiator. This initiator may be either water soluble or oil soluble, depending on the solvent chosen. Examples of free radical initiators used are azo compounds, benzoyl peroxide, azobisisobutyronitrile, azobis (2-amidinopropane) dihydrochloride. In addition, inorganic peroxy compounds such as ammonium persulfate, sodium persulfate or potassium persulfate are used in combination with sodium or potassium metabisulfite. As a general rule, 0.1 to 15 grams of free-radical initiator are used per 100 grams of total monomer.

Regardless of the system chosen, monomer mixing and initiator addition may be achieved by simply preparing a solution of all the desired monomers and the subsequent or simultaneous addition of initiator. Because of varying rates of reaction of the comonomers, formation of undesired copolymers or homopolymers may occur in addition to the product of this invention. That is, some polymers may form which have little or no flavanoid tannin monomer therein. Depending on the final end use, these by-products may or may not be desirable.

An alternative method of monomer mixing and initiator addition involves first preparing a solution of the desired amounts of flavanoid tannin monomers and free-radical initiator. The subsequent addition of the conomoners thereto is at a controlled rate. This method greatly reduces the number of side reactions and increases the amount of grafting on the flavanoid tannin monomer.

It has been found that the polymers of this invention having the flavanoid tannin structure of Formula I and prepared in accordance with the method and process of this invention are unusually effective additives for aqueous drilling fluids. These materials have a synergistic effect in providing colloidal stability, lower viscosity and gel strength, lower filtrate loss, and thinner filter cakes. The performance and effectiveness of these polymers in aqueous drilling fluids which are subjected to elevated temperatures for extended periods of time are greatly superior to the next level of comparable aqueous drilling fluid additives which are described in the patent literature and in publications. The superiority of the polymers of this invention in aqueous drilling fluids is described in the attached working examples.

EXAMPLES

The following examples establish that flavanoid tannin derived monomers can be used to synthesize the polymer of this invention which is useful as a high temperature drilling fluid additive. In each of the Examples, the test muds contain 6 pounds per barrel of SPERSENE, These copolymers were formed according to the solution polymerization method described herein:

| | |
|---|---|
| #1: | 20% Quebracho Extract (sulfonated) |
| | 80% Acrylamide |
| #2: | 20% Quebracho Extract (sulfonated) |
| | 70% Acrylamide |
| | 10% 2-acrylamido-2-methylpropane sulfonic acid |
| #3: | 8% Quebracho Extract (sulfonated) |
| | 75% Acrylamide |
| | 17% Maleic Acid |
| #4: | 12.5% Quebracho Extract (sulfonated) |
| | 71% Acrylamide |
| | 16.5% Maleic Acid |
| #5: | 11% Quebracho Extract (sulfonated) |
| | 54% Acrylamide |
| | 21% 2-acrylamido-2-methylpropane sulfonic acid |
| | 13% Maleic Acid |
| #6: | 33% Quebracho Extract (sulfonated) |
| | 16% 2-acrylamido-2-methylpropane sulfonic acid |
| | 25% Acrylic Acid |
| | 26% Tetrahydrophthalic Acid |
| #7: | 33% Quebracho Extract (sulfonated) |
| | 25% Acrylamide |
| | 16% 2-acrylamido-2-methylpropane sulfonic acid |
| | 26% Tetrahydrophthalic Acid |

A 12 pounds per gallon fresh water mud contaminated with 4 pounds per barrel gypsum was treated with 3 pounds per barrel copolymers along with 6 ppb SPERSENE, and aged 16 hours at the temperature indicated. (In the following tables, the temperature is in °F., apparent viscosity (AV) and plastic viscosity (PV) in centipoise, yield point (YP) and gel strength (GS) in pounds per 100 square feet, and the API fluid loss (FL) in milliliters.)

| CO-POLYMER | TEMP | AV | PV | YP | GS 10 Sec | GS 10 Min | FL |
|---|---|---|---|---|---|---|---|
| Miltemp | 300 | 35 | 36 | 0 | 1 | 1 | — |
| | 400 | 66 | 54 | 15 | 2 | 7 | 11.8 |
| | 425 | 88 | 67 | 30 | 4 | 97 | 12.6 |
| #1 | 300 | 34 | 35 | 0 | 1 | 1 | — |
| | 400 | 48 | 45 | 7 | 2 | 6 | 10.1 |
| | 425 | 66 | 48 | 36 | 17 | 260 | 12.0 |
| #2 | 300 | 34 | 34 | 1 | 2 | 3 | — |
| | 400 | 36 | 35 | 3 | 2 | 2 | 9.6 |
| | 425 | 52 | 32 | 41 | 14 | 300 | 11.0 |
| #3 | 300 | 35 | 36 | 0 | 1 | 1 | — |
| | 400 | 46 | 44 | 3 | 3 | 3 | 7.4 |
| | 425 | 59 | 50 | 18 | 5 | 30 | 9.8 |
| #4 | 300 | 37 | 38 | 0 | 1 | 1 | — |
| | 400 | 55 | 51 | 8 | 2 | 3 | 8.4 |
| | 425 | 54 | 45 | 19 | 5 | 32 | 10.3 |

This table illustrates that the incorporation of a dicarboxylic acid monomer, such as maleic acid or tetrahydrophthalic acid, into the polymer of this invention reduces the high temperature gel strength of the drilling fluid.

Similarly, incorporation of 2-acrylamido-2-methylpropane sulfonic acid into the polymer of this invention improves the rheology and fluid loss of the drilling fluid. To demonstrate the improvement in uncontaminated fresh water muds, 12 pounds per gallon fresh water mud was treated with 3 pounds per barrel copolymer and aged 16 hours at the temperature indicated.

| CO-POLYMER | TEMP | AV | PV | YP | GS 10 Sec | GS 10 Min | FL |
|---|---|---|---|---|---|---|---|
| Miltemp | 300 | 42 | 40 | 5 | 2 | 2 | — |
| | 350 | 55 | 53 | 5 | 3 | 4 | — |
| | 405 | 63 | 52 | 22 | 19 | 66 | 10.4 |
| #5 | 200 | 42 | 41 | 3 | 1 | 1 | — |
| | 300 | 41 | 44 | 0 | 1 | 1 | — |
| | 400 | 42 | 40 | 4 | 2 | 2 | 7.2 |
| #6 | 300 | 41 | 38 | 6 | 2 | 3 | — |
| | 350 | 55 | 50 | 10 | 3 | 3 | — |
| | 400 | 64 | 57 | 14 | 3 | 4 | 6.6 |

As another example, 12 pounds per gallon fresh water mud was treated with 3 pounds per barrel copolymer and 6 pounds per barrel SPERSENE and aged 16 hours at the temperature indicated.

| CO-POLYMER | TEMP | AV | PV | YP | GS 10 Sec | GS 10 Min | FL |
|---|---|---|---|---|---|---|---|
| Miltemp | 300 | 41 | 37 | 8 | 4 | 5 | — |
| | 350 | 56 | 51 | 9 | 6 | 7 | — |
| | 400 | 60 | 60 | 34 | 9 | 49 | 9.0 |
| #7 | 300 | 50 | 49 | 1 | 3 | 3 | — |
| | 350 | 54 | 53 | 1 | 4 | 4 | — |
| | 400 | 65 | 64 | 2 | 6 | 8 | 7.3 |

As another example of gypsum contaminated mud, 12 pounds per gallon fresh water mud contaminated with 4 pounds per barrel gypsum was treated with 3 pounds per barrel copolymer and 6 pounds per barrel SPERSENE and aged 16 hours at the temperature indicated.

| CO-POLYMER | TEMP | AV | PV | YP | GS 10 Sec | GS 10 Min | FL |
|---|---|---|---|---|---|---|---|
| Miltemp | 300 | 34 | 32 | 3 | 3 | 3 | — |
| | 350 | 69 | 57 | 24 | 13 | 13 | — |
| | 400 | 72 | 67 | 10 | 2 | 8 | 9.2 |
| #7 | 300 | 48 | 47 | 2 | 3 | 3 | — |
| | 350 | 60 | 56 | 8 | 3 | 3 | — |
| | 400 | 64 | 56 | 15 | 3 | 5 | 8.8 |

As an example of salt contaminated mud, 12 pounds per gallon fresh water mud contaminated with 5 pounds per barrel sodium chloride was treated with 3 pounds per barrel copolymer and aged 16 hours at the temperature indicated.

| CO-POLYMER | TEMP | AV | PV | YP | GS 10 Sec | GS 10 Min | FL |
|---|---|---|---|---|---|---|---|
| Miltemp | 300 | 44 | 34 | 19 | 5 | 26 | — |
| | 350 | 55 | 47 | 16 | 5 | 24 | — |
| | 400 | 56 | 36 | 40 | 40 | 96 | 15.6 |
| #7 | 300 | 48 | 44 | 9 | 3 | 8 | — |
| | 350 | 60 | 48 | 24 | 3 | 22 | — |
| | 400 | 52 | 35 | 35 | 30 | 44 | 11.8 |

As an example of a mud containing a high concentration of hydratable solids, 20 pounds per barrel of calcium bentonite were added to a 12 pounds per gallon fresh water mud. The mud was treated with 3 pounds per barrel copolymer and 6 pounds per barrel SPERSENE and aged 16 hours at the indicated temperature.

| CO-POLYMER | TEMP | AV | PV | YP | GS 10 Sec | GS 10 Min | FL |
|---|---|---|---|---|---|---|---|
| Miltemp | 300 | 72 | 63 | 19 | 5 | 8 | — |
|  | 350 | 100 | 81 | 39 | 5 | 13 | — |
|  | 400 | 110 | 86 | 48 | 9 | 162 | 7.3 |
| #7 | 300 | 88 | 76 | 25 | 5 | 7 | — |
|  | 350 | 93 | 76 | 34 | 5 | 6 | — |
|  | 400 | 126 | 102 | 48 | 7 | 19 | 5.2 |

The material identified for purposes of this application as 2-acrylamido-2-methylpropane sulfonic acid is sold commercially by the Lubrizol Corporation under the trademark AMPS.

What is claimed is:

1. A new composition of matter, a free-radical initiated, water soluble polymer, said polymer being characterized by thermal stability at temperature above 300° F. and exhibiting utility as an aqueous drilling fluid additive, said polymer comprising the reaction product of:

(a) a minor portion of a tannin derived monomer, said monomer being wholly or substantially flavanoid tannins, having, or being oligomers of, the formula:

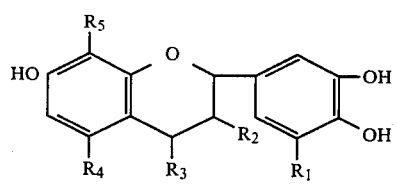

wherein $R_1$ is a hydrogen or a hydroxyl;
wherein $R_2$ is a hydrogen or a hydroxyl;
wherein $R_3$ is a hydrogen or a hydroxyl or a methyl;
wherein $R_4$ is a hydrogen or a hydroxyl and
where $R_5$ is a hydrogen or a methyl; and (b) a major portion of one or more ethylenically unsaturated monomers, said ethylenically unsaturated monomers being reactive with said tannin derived monomer in the free-radical condition.

2. The polymer of claim 1 wherein at least one of said ethylenically unsaturated monomers is selected from the group consisting of: acrylic acid, methacrylic acid, and crotonic acid or the esters, amides and nitriles thereof or combinations thereof.

3. The polymer of claim 1 wherein at least one of said ethylenically unsaturated monomers is selected from the group consisting of: maleic acid, itaconic acid, tetrahydrophthalic acid, fumaric acid and citraconic acid, or the anhydrides, esters, amides, nitriles and imides thereof, or combinations thereof.

4. The polymer of claim 1 wherein at least one of said ethylenically unsaturated monomers is selected from the group consisting of: styrene sulfonic acids, vinyl sulfonic acids, vinyl phosphonates, and 2-acrylamido-2-methylpropane sulfonic acid, or derivatives thereof, or combinations thereof.

5. A free-radical initiated, water soluble polymer, said polymer being characterized by thermal stability at temperatures above 300° F. and exhibiting utility as an aqueous drilling fluid additive, comprising the reaction product of:

(a) a minor portion of flavanoid tannin monomers having, or being oligomers of, the formula:

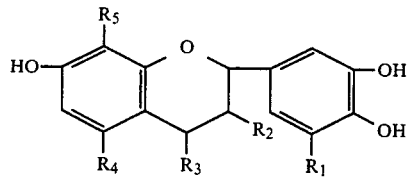

wherein $R_1$ is a hydrogen or a hydroxyl;
wherein $R_2$ is a hydrogen or hydroxyl;
wherein $R_3$ is a hydrogen, hydroxyl, or methyl;
wherein $R_4$ is a hydrogen, hydroxyl, or methyl and
wherein $R_5$ is a hydrogen or methyl; and (b) an acrylic monomer.

6. The water soluble polymer of claim 5 wherein said acrylic monomer is selected from the group consisting of: acrylic acid, methacrylic acid, crotonic acid, fumaric acid, maleic acid, itaconic acid, tetrahydrophthalic acid and citraconic acid, or the anhydrides, esters, amides, nitriles and imides thereof, or combinations thereof.

7. The water soluble polymer of claim 5 further comprising a dicarboxylic acid monomer.

8. The water soluble polymer of claim 7 wherein said dicarboxylic acid is selected from the group consisting of: maleic anhydride, tetrahydrophthalic anhydride, itaconic acid or combinations thereof.

9. The water soluble polymer of claim 5 further comprising a substituted amide of the formula:

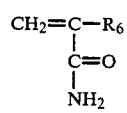

wherein $R_6$ is a hydrogen or a methyl group.

10. The water soluble polymer of claim 5 further comprising a minor portion of an unsaturated sulfonic acid of the formula:

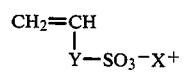

wherein Y represents a direct combination or a bridging element
and $X^+$ represents a cation.

11. The water soluble polymer of claim 10 wherein said bridging element is according to the formula:

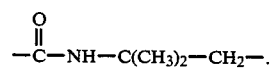

12. A free-radical initiated, water soluble polymer, said polymer being characterized by thermal stability at temperatures above 300° F. and exhibiting utility as an aqueous drilling fluid additive, comprising the reaction products of:

(a) a minor portion of flavanoid tannin monomers having, or being oligomers of, the formula:

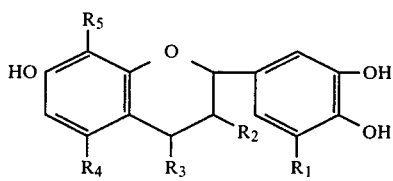

wherein $R_1$ is a hydrogen or a hydroxyl;
wherein $R_2$ is a hydrogen or hydroxyl;
wherein $R_3$ is a hydrogen, hydroxyl, or methyl;
wherein $R_4$ is a hydrogen, hydroxyl, or methyl; and
wherein $R_5$ is a hydrogen or methyl; and
(b) an acrylic monomer;
(c) an unsaturated sulfonic acid of the formula:

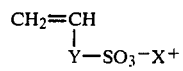

wherein Y represents a direct combination or a bridging element
and $X^+$ represents a cation;
(d) a dicarboxylic acid monomer.

13. The water soluble polymer of claim 12 wherein said acrylic monomer is selected from the group consisting of: acrylic acid, methacrylic acid, acrylamide, and methacrylamide, or combination thereof.

14. The water soluble polymer of claim 12 wherein said bridging element is according to the formula:

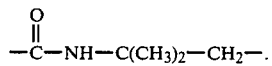

15. The water soluble polymer of claim 12 wherein said dicarboxylic acid is selected from the group consisting of: maleic anhydride, tetrahydrophthalic anhydride, and itaconic acid, or combinations thereof.

16. A free-radical initiated, water soluble polymer, said polymer being characterized by thermal stability at temperatures above 300° F. and exhibiting utility as an aqueous drilling fluid additive, comprising the reaction products of:

(a) a minor portion of a flavavoid tannin monomers having, or being oligomers of, the formula:

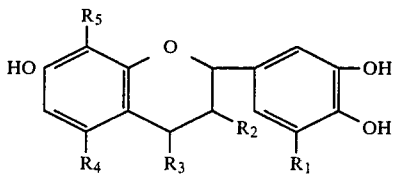

wherein $R_1$ is a hydrogen or a hydroxyl;
wherein $R_2$ is a hydrogen or hydroxyl;
wherein $R_3$ is a hydrogen, hydroxyl, or methyl;
wherein $R_4$ is a hydrogen, hydroxyl, or methyl and
wherein $R_5$ is a hydrogen or methyl;
(b) an acrylic monomer, said monomer selected from the group consisting of: acrylic acid, methacrylic acid, acrylamide, and methacrylamide, or combinations thereof;
(c) an unsaturated sulfonic acid of the formula:

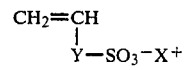

wherein Y represents a direct combination or a bridging element according to the formula:

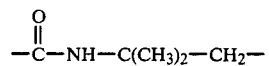

$X^+$ represents a cation; and
(d) a minor portion of a dicarboxylic acid monomer, said monomer selected from the group consisting of maleic anhydride, tetrahydrophthalic anhydride, and itaconic acid, or combinations thereof.

* * * * *